June 24, 1941.                W. G. ROMAN                2,246,926
                SURGE PROTECTION FOR ELECTRICAL APPARATUS
                         Filed Nov. 1, 1938

WITNESSES:
P. J. Fitzgerald
F. O. Lyle

INVENTOR
Walter G. Roman.
BY O. B. Buchanan
ATTORNEY

Patented June 24, 1941

2,246,926

UNITED STATES PATENT OFFICE 2,246,926

SURGE PROTECTION FOR ELECTRICAL APPARATUS

Walter G. Roman, Wilkinsburg, Pa., assignor to Westinghouse Electric & Manufacturing Company, East Pittsburgh, Pa., a corporation of Pennsylvania Application November 1, 1938, Serial No. 238,186

6 Claims. (Cl. 172—237)

The present invention relates to the protection of electrical apparatus against voltage surges or dangerous oscillatory voltages and, more particularly, to the protection of apparatus, such as dynamo-electric machines, connected to a high voltage transmission line through transformers.

Electrical apparatus, such as dynamo-electric machines or other electrical instrumentalities, which is energized from a high voltage transmission line, is usually connected to the line through transformers. The transformers are usually connected in star on the high voltage side with the neutral point grounded, while the low voltage windings of the transformers and the machines connected to them are connected in delta. The high voltage windings of the transformers are usually protected against lightning or other voltage surges by means of lightning arresters. Such surges, however, are transmitted through the transformer by both electrostatic and electromagnetic induction, and even if the voltage is limited by lightning arresters on the high voltage side, dangerously high voltages may be produced on the low side and impressed on the machines connected to the transformer. The electrostatic components transmitted in this way are usually of very short duration, and can be absorbed by capacitors connected between the terminals of the machine and ground. The electromagnetic components are of relatively much longer duration, however, and since the capacitors, together with the inductive windings of the machine and transformers, form an oscillatory circuit, dangerously high voltage peaks may be impressed on the windings of the machine. These oscillatory voltage peaks can be eliminated, or at least substantially reduced, by connecting lightning arresters across the capacitors, but, since both the protected machine and the transformers are usually delta connected, lightning arresters having a rating at least as high as the phase-to-phase voltage of the machine must be used. Arresters of this rating offer only a very small margin of protection, however, besides materially increasing the expense of the installation.

The object of the present invention is to provide an improved and inexpensive means for the protection of electrical apparatus against voltage surges and oscillatory voltage peaks.

More specifically, the object of the invention is to provide an arrangement for the protection of electrical apparatus connected to a high voltage transmission line through transformers which will give better protection against voltage surges that can be obtained with lightning arresters and at substantially less cost. This object is attained by using capacitors connected between each terminal of the apparatus to be protected and ground in the manner described above, and connecting a resistor in series with each capacitor. The values of the resistor and capacitor are so chosen with respect to each other and to the inductances of the transformer and machine windings that the circuit will be non-oscillatory, and dangerous voltage peaks will be eliminated.

With this arrangement, the maximum voltage impressed on the machine windings during a voltage surge originating on the transmission line can be reduced to materially less than the maximum voltage that can be obtained by means of a lightning arrester. It will, of course, be apparent that the usefulness of this arrangement is not limited to the case of electrical apparatus connected to a high voltage transmission line, but that it can be used to advantage in connection with any electrical system where it is desired to prevent the occurrence of oscillatory voltages and thus to limit the magnitude of the voltage peaks that may occur in the system.

The invention will be more fully understood from the following detailed description taken in connection with the accompanying drawing, in which.

Figure 1:
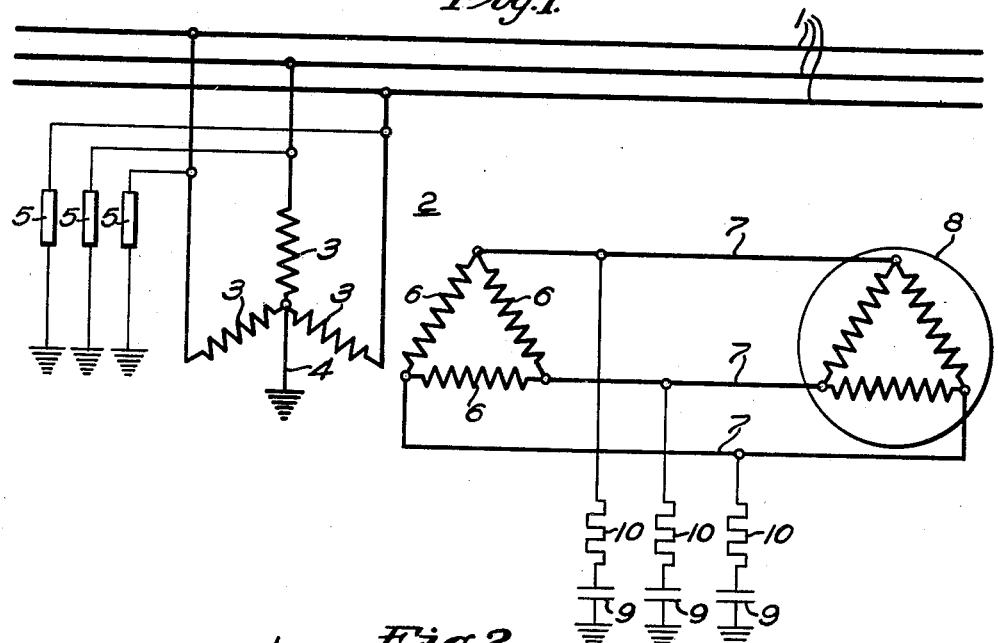
Figure 1 shows diagrammatically a typical circuit arrangement with which the protective arrangement of the present invention can be used.

The protective arrangement of the present invention is particularly adapted, as mentioned above, for use in connection with electrical apparatus, such as dynamo-electric machines, which are energized from a high voltage transmission line, and it is shown as applied to such a system in Fig. 1. In this figure, a high voltage three-phase transmission line is indicated at 1 and a transformer bank, generally designated by 2, is connected to the line. The primary or high voltage windings 3 of the transformer bank are connected in star, and the neutral point is grounded as indicated at 4. Lightning arresters 5 are connected between each terminal of the high voltage windings 3 and ground to protect the transformers against lightning or other voltage surges.

The secondary or low voltage windings 6 of the transformer bank are connected in delta, and are connected by conductors 7 to the windings of a dynamo-electric machine 8, such as an electric motor, which is to be supplied from the transmission line 1, and which is also delta connected. It should be understood that, although only one machine has been shown, a plurality of such machines may be connected in parallel to be supplied from the transformer bank 2.

For the protection of the machine 8 against voltage surges originating on the transmission line 1, a capacitor 9 and resistor 10 are connected in series between each of the conductors 7 and ground. The values of the resistors and capacitors are so chosen that the circuit which they form with the windings of the transformers and the machine 8 is non-oscillatory, and it will be seen that the effect is to provide means connected between each terminal of the protected machine and ground for absorbing voltage surges without injury to the machine, and for preventing the occurrence of dangerous oscillatory voltages.

The effect of connecting a resistor in series with each capacitor is to damp the voltage oscillations which would otherwise occur. This will be more fully understood from a consideration of Fig. 2 which shows the equivalent single-phase circuit for the system of Fig. 1. In this figure, E represents the surge voltage impressed on the system, which may be assumed to be held to a substantially constant maximum value by the lightning arresters 5 on the high voltage side of the transformers. $L_1$ represents the inductance per phase of the transformer windings 6, and $L_2$ represents the inductance per phase of the machine 8 or the resultant inductance per phase of a plurality of machines connected in parallel. $R'$ and $C'$, respectively, represent the resistors 10 and capacitors 9. It will be seen that the values $R'$ and $C'$ of resistance and capacitance in the equivalent circuit are related to the actual values R and C by the expressions:

$$R' = 2R \quad C' = \frac{C}{2}$$

It can be shown that the current $i$ in the branch $L_2$ of this circuit, which represents the windings of the protected apparatus, neglecting damping, is given in general by the differential equation $$\frac{d^2i}{dt^2} + R'\left(\frac{1}{L_1}+\frac{1}{L_2}\right)\frac{di}{dt} + \frac{1}{C'}\left(\frac{1}{L_1}+\frac{1}{L_2}\right) = 0$$

where $t$ is the time.

When $R'$ is equal to zero, or in other words, when a capacitor alone is used for the protection of the machine, the solution of this equation is $$i = \frac{E}{L_1+L_2}\left(t - \frac{1}{\sqrt{\frac{1}{C'}\left(\frac{1}{L_1}+\frac{1}{L_2}\right)}} \sin\sqrt{\frac{1}{C'}\left(\frac{1}{L_1}+\frac{1}{L_2}\right)}\,t\right)$$

and the voltage impressed on $L_2$ is $$e = L_2\frac{di}{dt} = E\frac{L_2}{L_1+L_2}\left(1 - \cos\sqrt{\frac{1}{C'}\left(\frac{1}{L_1}+\frac{1}{L_2}\right)}\,t\right)$$

It is evident that this is an oscillatory voltage which may reach dangerously high values.

Figure 3:
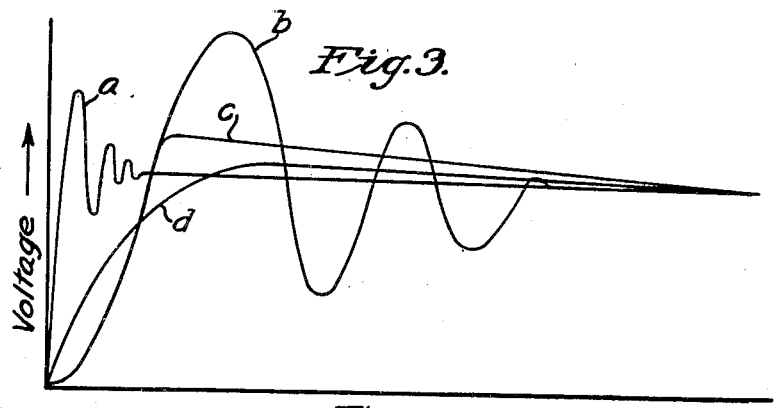
Fig. 3 shows certain explanatory curves.

Fig. 3 shows the voltages applied to the windings of the machine 8 with various degrees of protection. Curve $a$ shows the surge voltage that would be impressed on the machine with no protection at all on the low voltage side of the transformers, and it will be seen that this voltage has a very steep wave front which is highly dangerous to the turn insulation of the machine. With a capacitor only connected between each terminal of the machine and ground, the electrostatic components of the voltage transmitted through the transformers are absorbed, but since the capacitor forms an oscillatory circuit with the transformer and machine windings, the voltage impressed on the machine will be given by the above equation, which is plotted in Fig. 3 as curve $b$. It will be seen that excessively high voltage peaks are produced in this way which are very dangerous to the machine insulation. The amplitude of the oscillatory component of this curve is shown decreasing in Fig. 3 as it is assumed that there will be some damping in the circuit which has been neglected in deriving the equations.

The voltage peaks produced by this oscillatory circuit can be reduced by using lightning arresters connected across the capacitors, which gives a voltage impressed on the machine as shown by curve $c$, but as explained above, lightning arresters, when used with a system of this type, give only a very small margin of protection and substantially increase the cost of the installation.

According to the present invention, therefore, it is proposed to eliminate voltage oscillations and the dangerous voltage peaks resulting from them by connecting resistors in series with the capacitors to damp the oscillations and form a non-oscillatory circuit. Referring to the general equation given above for the current in the equivalent circuit of Fig. 2, the critical value of resistance necessary to damp the oscillations in the circuit may be obtained from this equation by solving it as a quadratic equation having the same coefficients which will have as roots $$-R'\left(\frac{1}{L_1}+\frac{1}{L_2}\right) \pm \sqrt{\frac{R'^2\left(\frac{1}{L_1}+\frac{1}{L_2}\right)^2 - \frac{4}{C'}\left(\frac{1}{L_1}+\frac{1}{L_2}\right)}{2}}$$

The critical value for damping will occur when these roots are equal, or, in other words, when the quantity under the radical is equal to zero. Therefore, $$\frac{R'^2}{4}\left(\frac{1}{L_1}+\frac{1}{L_2}\right)^2 = \frac{1}{C'}\left(\frac{1}{L_1}+\frac{1}{L_2}\right)$$

$$\frac{R'^2}{4}\left(\frac{1}{L_1}+\frac{1}{L_2}\right) = \frac{1}{C'}$$

Substituting the actual values R and C of the resistors 10 and capacitors 9, respectively, in this equation, it will be seen that the necessary relation of the constants in the circuit, to make it non-oscillatory is given by the equation:

$$R^2\left(\frac{1}{L_1}+\frac{1}{L_2}\right) = \frac{2}{C}$$

Figure 2:
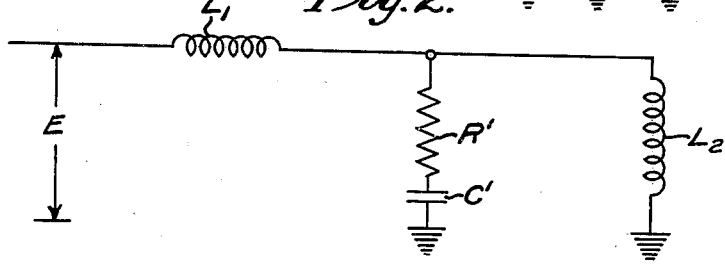
Fig. 2 shows an equivalent circuit corresponding to the circuit of Fig. 1.

When the general equation for current in the circuit of Fig. 2 is solved, assuming the relation between $R'$ and $C'$ just obtained, the solution is $$i = \frac{E}{L_1+L_2}\left(t - t\epsilon^{-\frac{R'}{2}\left(\frac{1}{L_1}+\frac{1}{L_2}\right)t}\right)$$

and the voltage is $$e = L_2\frac{di}{dt} = E\frac{L_2}{L_1+L_2}$$

$$\left[1 + \left(\frac{R'}{2}\left(\frac{1}{L_1}+\frac{1}{L_2}\right)t - 1\right)\epsilon^{-\frac{R'}{2}\left(\frac{1}{L_1}+\frac{1}{L_2}\right)t}\right]$$

This voltage is plotted in Fig. 3 as curve $d$, and it will be seen that the maximum voltage is greatly reduced and that the rate of rise of the voltage is relatively low.

Higher values of resistance can be used than the value necessary to just damp the oscillations. Such higher values will result in overdamping and will somewhat further reduce the maximum voltage applied to the windings of the protected machine.

It will be seen, therefore, that a simple and relatively inexpensive means has been provided for the protection of electrical apparatus against voltage surges, and that this arrangement provides better protection for a system such as that shown than can be obtained by means of lightning arresters and at substantially less cost. It is to be understood that the usefulness of this protective arrangement is not limited to the particular application shown, but that it may be applied to any type of electrical system where it is desired to absorb voltage surges, produced by any cause, without damage to the apparatus, or where it is desired to suppress voltage oscillations and prevent the high voltage peaks that may be caused by them.

Although a specific embodiment has been illustrated and described, it is to be understood that the invention is not limited to the exact arrangement shown, and is not limited in its application to the particular type of system selected for illustration, but that various modifications and other applications of the protective system herein disclosed may be made without departing from the spirit of the invention, and in its broadest aspect, therefore, it includes all modifications and embodiments that fall within the scope of the appended claims.

I claim as my invention:

1. An electrical system comprising transformer means, a dynamo-electric machine connected to said transformer means and supplied thereby, and means for protecting the machine against voltage surges comprising a capacitor and a resistor connected in series between each terminal of the machine and ground, the capacitance C and resistance R of said capacitor and resistor being such that $$R^2\left(\frac{1}{L_1}+\frac{1}{L_2}\right)=\frac{2}{C}$$

where $L_1$ and $L_2$ are the inductance per phase of the transformer and of the dynamo-electric machine, respectively.

2. An electrical system comprising transformer means, a dynamo-electric machine connected to said transformer means and supplied thereby, and means for protecting the machine against voltage surges comprising a capacitor and a resistor connected in series between each terminal of the machine and ground, the capacitance C and resistance R of said capacitor and resistor being such that $$R^2\left(\frac{1}{L_1}+\frac{1}{L_2}\right)>\frac{2}{C}$$

where $L_1$ and $L_2$ are the inductance per phase of the transformer and of the dynamo-electric machine, respectively.

3. An electrical system comprising transformer means, a plurality of polyphase dynamo-electric machines connected in parallel to said transformer means and supplied thereby, and means for protecting said machines against voltage surges comprising a capacitor and a resistor connected in series between each of the common connections from said machines to the transformer means and ground, the capacitance C and resistance R of said capacitor and resistor being such that $$R^2\left(\frac{1}{L_1}+\frac{1}{L_2}\right)=\frac{2}{C}$$

where $L_1$ and $L_2$ are the inductance per phase of the transformer means and the resultant inductance per phase of said plurality of dynamo-electric machines, respectively.

4. An electrical system comprising transformer means, a plurality of polyphase dynamo-electric machines connected in parallel to said transformer means and supplied thereby, and means for protecting said machines against voltage surges comprising a capacitor and a resistor connected in series between each of the common connections from said machines to the transformer means and ground, the capacitance C and resistance R of said capacitor and resistor being such that $$R^2\left(\frac{1}{L_1}+\frac{1}{L_2}\right)>\frac{2}{C}$$

where $L_1$ and $L_2$ are the inductance per phase of the transformer means and the resultant inductance per phase of said plurality of dynamo-electric machines, respectively.

5. In an electrical system including an inductive circuit and an electrical device connected thereto, means for protecting said device against voltage surges comprising a resistor and a capacitor connected in series between each terminal of the device and ground, the resistance R of the resistor and the capacitance C of the capacitor being such that $$R^2\left(\frac{1}{L_1}+\frac{1}{L_2}\right)=\frac{2}{C}$$

where $L_1$ and $L_2$ are the inductances of said inductive circuit and said electrical device, respectively.

6. In an electrical system including an inductive circuit and an electrical device connected thereto, means for protecting said device against voltage surges comprising a resistor and a capacitor connected in series between each terminal of the device and ground, the resistance R of the resistor and the capacitance C of the capacitor being such that $$R^2\left(\frac{1}{L_1}+\frac{1}{L_2}\right)>\frac{2}{C}$$

where $L_1$ and $L_2$ are the inductances of said inductive circuit and said electrical device, respectively.

WALTER G. ROMAN.